Sept. 11, 1962 J. B. OSBORNE 3,053,643
UNITARY FLUIDIZED APPARATUS WITH REACTOR
SUPERPOSED ON REGENERATOR
Filed Dec. 17, 1958

INVENTOR.
JOHN B. OSBORNE
BY
ATTORNEY
AGENT

United States Patent Office 3,053,643
Patented Sept. 11, 1962

3,053,643
UNITARY FLUIDIZED APPARATUS WITH REACTOR SUPERPOSED ON REGENERATOR
John B. Osborne, South Orange, N.J., assignor to The M. W. Kellogg Company, Jersey City, N.J., a corporation of Delaware
Filed Dec. 17, 1958, Ser. No. 781,159
6 Claims. (Cl. 23—288)

This invention relates to improvements in the process and apparatus for contacting gases and vapors with finely divided contact material cyclically circulated in a unitary system. In one aspect, the invention is directed to an improved method for the catalytic treatment of different hydrocarbon feed materials and stripping of the finely divided catalytic material which is cyclically circulated in a unitary system.

Many fluid type catalyitc hydrocarbon conversion systems have been proposed in the prior art wherein a powdered or granular catalytic material effects conversion while the catalyst is suspended in the gases, vapor or liquid hydrocarbon undergoing conversion conditions. In these processes, the catalyst and reaction products are separated by various means and the catalyst is recycled either to a reaction zone or passes to a regeneration zone for the removal of carbonaceous deposits of reaction from the catalyst by burning in an oxygen-containing gas. Thereafter, the regeneration gases are separated from the catalyst and the regenerated catalyst, at the desired temperatures, is returned to the reaction steps of the process. Numerous variations of such a cyclic process have been proposed, each with its own benefits and deficiencies. However, these processes have not been completely satisfactory, either because of the complexity of the apparatus required or ineffective steps within the process for efficient utilization of the catalyst and recovery of desired hydrocarbon products.

It is an object of this invention to provide an improved method and apparatus whereby the above deficiencies will be minimized and to provide a system for contacting different fluid reactants with finely divided contact material in a unitary apparatus.

Another object of this invention is to provide a more versatile method and means for transferring finely divided contact material through reaction steps, stripping steps and a regeneration step.

A further object of this invention is to provide an improved method of stripping whereby the catalyst or contact material is more efficiently stripped of occluded reaction products.

Other objects and advantages of the improved method and apparatus of this invention will become more apparent from the following description.

In a broad aspect, the method and apparatus for contacting finely divided catalytic material successively with different fluid streams according to the present invention comprises providing a reactor chamber positioned above a regenerator chamber with a stripping chamber positioned within a portion of the reactor chamber. The catalyst flows through a closed circuit including the above-mentioned chambers. In such a system, the required rate of circulation of the catalyst is obtained by creating hydrostatic pressure heads and then utilizing the pressure head developed to attain the desired flow. The magnitude of the pressure heads developed is limited in practice by the maximum density of the fluidized catalyst and the limited velocities which can be employed in the transfer lines. The efficiency of any systems or apparatus of this type, therefore, is greatly influenced by the efficiency with which the necessary pressure differences are created and the efficiency with which all available pressure differences are utilized. These factors are, however, primarily determined by the size, shape and position of the various transfer lines and chambers and, therefore, their physical relationship is of utmost importance. In addition to the above, it is essential and necesary to obtain the desired contact time with either gases or vaporous material to effect the desired reactions or contact in the respective contact chambers. These factors are also of primary importance in providing an efficient system or apparatus to effect the desired contact.

To provide for the cyclic circulation of the catalyst material through the apparatus, a riser conduit is provided which extends substantially vertically upwardly from the lower portion of the regenerator chamber to the upper portion of the reactor chamber and above a relatively dense fluid bed of catalytic material therein. The riser conduit carries freshly regenerated catalytic material admixed with a first reactant material upwardly therethrough. At the upper end of the riser conduit the finely divided catalyst and reactant product are separated with the separated catalytic material settling onto the fluid bed of material in the reactor chamber. It is to be understood, of course, that more than one riser conduit may be provided for contacting the same or a different portion of the reactant material therein.

As mentioned before, the reactor chamber contains a relatively dense fluid bed of catalytic material therein and provision is made for introducing a second gaseous material or volatile material which may or may not be completely liquid into the lower portion of this fluid bed phase. A dilute or dispersed catalyst phase exists above the relatively dense fluid bed phase wherein suitable cyclone recovery equipment is provided to separate entrained finely divided catalytic material from the reaction products with the separated catalytic material being returned to the dense fluid bed phase therebelow through suitable diplegs. During the contact of the hydrocarbon reactant materials with the finely divided catalyst, the catalyst becomes contaminated with reaction products which require different severity of treatment for their removal from the catalyst. Accordingly, to more completely and efficiently accomplish the removal of these reaction products from the catalyst, applicant has provided an improved stripper arrangement in the apparatus briefly discussed above. That is, applicant withdraws contaminated catalyst from the lower portion of the dense fluid bed phase and passes the withdrawn catalyst material downwardly through a first stripping well countercurrent to a first stripping gas. The partially stripped catalyst is then admixed with a gaseous material such as steam and passed upwardly as a dilute phase through a second short contact time riser stripper to above a dense fluid bed of catalytic material maintained in the stripper chamber previously mentioned. In the dilute phase stripper, the partial pressure of the more volatile hydrocarbon retained on the catalyst is reduced and the hydrocarbon is effectively removed from the catalyst. The catalytic material and stripping gas containing stripped products of reaction, upon discharge from the riser conduit are immediately separated with the separated catalyst settling onto a dense fluid bed of catalyst in the stripper chamber for further treatment with additional stripping gas. In the third stripping stage or relatively dense fluid phase stripping step, the catalytic material contaminated with hydrocarbons which are more difficult to remove moves generally downwardly countercurrent to stripping gas introduced to the lower portion of the fluid bed. The dense phase stripping is effected under elevated temperature conditions and for a sufficient period of contact time for the heavy hydrocarbons retained on the catalyst to undergo a soaking type of conversion or cracking to more volatile products which will be stripped from the catalyst and recovered as product. It is preferred that this dense phase conversion step in the presence of stripping gases be effected for as long a period of time as possible, the longer the time available consistent with the apparatus limitations to accomplish this step is the most desirable.

In accordance with one embodiment of this invention, a fresh feed reactant material is passed in contact with hot freshly regenerated catalyst in a primary reactor or dilute phase reactor zone at a relatively high temperature above about 950° F., and preferably within the range of from about 1000 to about 1050° F., using a relatively high weight space velocity in the range of from about 50 to about 500 lbs. per hour of oil feed per pound of catalyst in the reaction zone. Accordingly, the reactant vapor passes upwardly through the first reaction zone at a velocity within the range of from about 3 to about 40 feet per second, depending upon the severity of cracking conditions required for the particular feed material being treated. Generally, the catalyst to oil ratio in the first reaction zone or dilute phase reaction zone on a weight basis is between about 2 and about 25.

Catalysts and vapors from the first transfer line dilute phase or riser conversion zone are separated in a disengaging space above the fluidized bed in the dense phase reaction zone whereby the separated catalyst settles into the dense fluidized bed, as hereinbefore discussed. A second feed or reactant material which may be the same or different from that employed in the first conversion zone is introduced into the lower portion of the dense fluidized bed of catalyst in the second reaction zone and converted to desired products under preselected conversion conditions. For example, the cracking temperature employed in the secondary conversion zone will be kept as high as possible consistent with the conversion desired therein and may be from about 850° F. to about 1000° F., and preferably from about 900° F. to about 925° F., with the reaction pressure in both zones maintained in the range of from about 1 atmosphere to about 50 p.s.i.g., preferably between about 5 and about 25 p.s.i.g. The weight space velocity of feed charged to the secondary reactor may be from about 0.5 to about 20, preferably from about 1 to about 5. The catalyst to oil ratio on a weight basis may be within the range of from about 3 to about 30, and preferably from about 10 to about 20.

This invention is not restricted to the employment of a single riser conduit, but it is contemplated employing more than one riser conduit for treatment under cracking conditions of the same feed stream in each riser conversion zone or different boiling range feed streams in the different riser conversion zones.

It is also contemplated within the scope of this invention to terminate the upper or discharge end of the riser conduit in the lower portion or the upper portion of the dense fluidized bed of catalyst.

As hereinbefore briefly discussed, spent or contaminated catalyst withdrawn from the second stage dense catalyst phase reaction zone is passed upwardly through one or more first stage dilute stripper conduits with stripping gas introduced through a vertical movable hollow stem plug valve positioned at the bottom open end of the first stage dilute phase stripper with the first stage stripper being open at the top thereof and capped with a deflector means such as a "bird cage" or deflector plate. The riser stripper discharges into the dispersed catalyst phase above the dense catalyst phase in the separate dense phase stripping zone. The dense phase stripping zone is separated from the second stage conversion zone by a suitable transfer partition which extends from the bottom of the second stage reactor to substantially the top thereof. That is, the dense phase stripper compartment may be vented in the upper portion or top thereof to the upper portion of the reactor chamber or the stripper compartment may be a completely separate compartment within the reactor and provided with separate means for withdrawal of stripped products from reaction products. The latter arrangement will be particularly advantageous where the refiner desires to operate the stripper at a higher or lower pressure than the conversion zone pressure.

In the second stage stripper, the stripper gas, usually steam admixed with the catalyst, passes upwardly at a velocity in the range of from about 5 to about 30 feet per second, whereby the most easily strippable reaction products are immediately separated from the catalyst and removed from the system prior to passing the thus stripped catalyst into the dense fluid phase or third stage stripping employed herein. The third stage stripping step of this invention accomplishes at least two objectives in the apparatus and process of this invention. In one aspect it provides for a soaking type of cracking of high boiling hydrocarbons retained on the catalyst and secondly the products are stripped and removed from the downwardly moving mass of catalyst by the stripping gas introduced to the bottom or lower portion thereof. Accordingly, by increasing the contact time with the stripper gas less recoverable hydrocarbon product is passed to the regeneration step. The third stage stripping is accomplished preferably by passing a suitable stripping gas, such as steam, upwardly through the catalyst as it moves generally downwardly as a relatively dense fluid bed through the stripping chamber. Generally, the temperature employed in the stripper will be similar to that employed in the second stage conversion zone, and usually at a temperature of from about 800 to about 950° F. However, it is within the scope of this invention to use higher or lower temperatures than indicated above where desired.

As suggested above, it is preferred that the catalyst in the dense phase stripping zone be retained therein, preferably longer than about 45 seconds, or as long as possible consistent with the limitation of the apparatus. In addition to steam, other suitable stripping materials may be employed, such as flue gas or normally gaseous hydrocarbons, for example, ethane, methane, propane and the like, or mixtures thereof, or any inert gas readily available to the refiner.

From the third stage stripper the catalyst is conveyed downwardly through a suitable standpipe to the lower portion of the regenerator controlled by a vertically movable plug valve aligned with the bottom open end of the standpipe. The catalyst is introduced into the dense fluidized bed of catalytic material maintained in the regeneration zone, preferably the lower portion thereof. In the regenerator the catalyst is regenerated by burning of the carbonaceous deposits on the catalyst with an oxygen-containing gas, such as air or diluted air at a temperature above about 1000° F., and preferably from about 1050 to about 1200° F., or higher. The pressure employed in the regenerator may be in the range of from about 5 to about 50 p.s.i.g., and preferably from about 20 to about 30 p.s.i.g. During burning of the carbonaceous deposits on the catalyst in the regeneration step, the catalyst is heated to an elevated temperature and the thus heated catalyst is passed to the riser or first stage conversion zone. Provisions are made surrounding the lower portion of each riser conduit for withdrawing and passing regenerated catalyst downwardly through an annular stripping well in countercurrent contact with a suitable stripping gas and thereafter the direction of flow of the catalyst is reversed with the catalyst being passed upwardly through the riser in admixture with a hydrocarbon reactant material.

Hydrocarbon feed materials, which are especially suitable for use in the process and apparatus of this invention, are those having an initial boiling point within the range of from about 400 to about 700° F., and an end point of from about 900° F. to about 1200° F. Generally these materials will have an API gravity of about 10 to about 30 API, these hydrocarbons being, for example, gas oils, reduced crudes, residual oils and the like. As hereinbefore indicated, it is preferred to employ a fresh hydrocarbon feed material in the riser conduit with the recycle product returned to the dense fluid bed reactor stage. It is also contemplated within the scope of this invention to separate the fresh feed into one or more different boiling range components and feeding the different fractions thereof to separate riser conversion zones under selected conversion conditions.

The catalyst to be employed in this invention may be any suitable catalyst, particularly a cracking catalyst and may be a siliceous material containing from about 70 to about 90% by weight of silica with the remainder being one or more of other suitable materials such as alumina, boria, magnesium, zirconium and the like, or mixtures thereof such as silica-alumina-boria, silica-alumina-magnesium, silica-alumina-zirconium, silica-alumina, etc.

Having thus generally described the process and apparatus of the present invention, reference will now be had by way of example, to the drawings which present diagrammatically the preferred embodiments of this invention.

Figure 1:
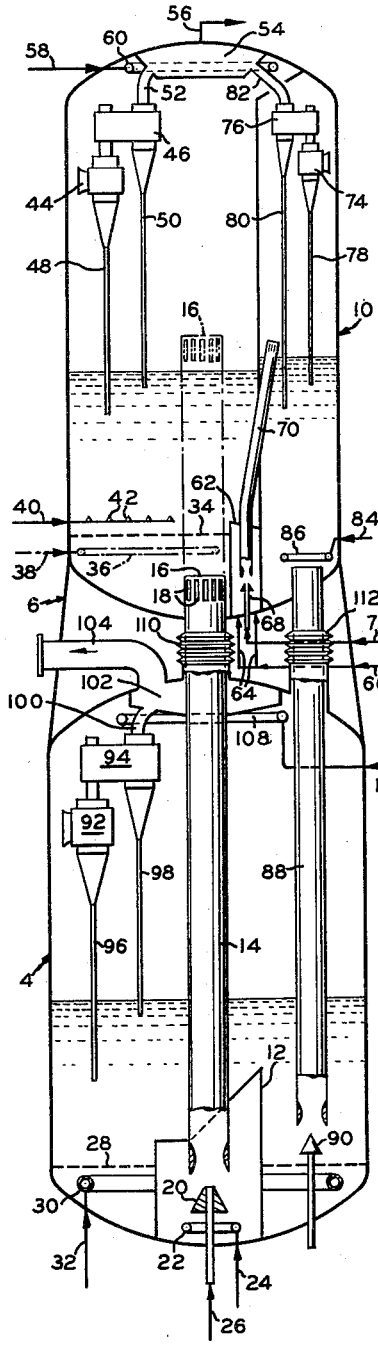
FIGURE 1 illustrates, in diagrammatic elevation, a contact system which may be a catalytic conversion system in which the catalyst is cyclically circulated in the system and contacted with gaseous and vaporous material therein.

Referring now to FIGURE 1 by way of example, a unitary vessel is provided having an upper reactor chamber 2 and a lower regenerator chamber 4 separated by a skirt member 6. The reactor chamber 2 is divided by a substantially vertical transverse partition 8 which divides the reactor chamber to provide a stripping chamber 10 in one portion of the reactor chamber, each of the chambers being operated to maintain a relatively dense fluid bed of contact material therein. Positioned in the lower portion of the regenerator chamber 4 and extending upwardly from the bottom thereof is a cylindrical catalyst withdrawal well defined by wall 12 with one side of the wall adjacent to the standpipe being higher than the other side to reduce the tendency of nonregenerated catalyst from passing into the wall. Concentrically positioned within the well defined by wall 12 is a conduit member 14 which extends from the lower portion of the well substantially vertically upward through the reactor chamber 2. The upper portion of the riser conduit 14 is capped by a solid plate member 16 and provided in the upper periphery thereof immediately adjacent the cap 16 with a plurality of elongated open slots 18. It is to be noted that the riser conduit 14 may terminate in the lower portion of the reactor chamber 12 or be extended upwardly therein, as shown by the dotted lines, to above the upper level of the dense bed of contact material maintained therein. Positioned within the well 12 and coaxially aligned with the bottom open end of riser conduit 14 is provided a vertically movable hollow stem plug valve 20 for the introduction of vaporous and/or volatile material to the bottom open end of the riser conduit. Provision is also made for introducing a suitable stripping gas through an annular distributor ring 22 positioned in the lower portion of the well 12. Conduit 24 is means for introducing stripping gas to the annular distributor ring 22.

Conduit 26 is means for introducing vaporous and/or volatile material to the hollow stem plug valve 20. Positioned in the lower portion of regenerator chamber 4 and below the open upper end of well 20 is a horizontally disposed grid 28. Positioned beneath the grid is a horizontally disposed distributor ring 30 provided for the introduction of regeneration gases to the lower portion of the regeneration chamber with conduit 32 providing means for introducing the regeneration gas to the distributor ring 30. Accordingly, regeneration gases introduced by distributor ring 30 pass upwardly through the perforations in grid 28 into the fluidized bed of contact material maintained in the lower portion of regenerator chamber 4 to remove carbonaceous contaminants from the catalyst by burning and thereby heating the catalyst to an elevated temperature. Regenerated catalyst is withdrawn from the dense fluidized bed as an annular stream which passes downwardly into the well 12 countercurrent to aerating and stripping gas introduced by ring 22. Thereafter, the catalyst reverses its direction of flow and passes upwardly through riser conduit 14 admixed with a vaporous and/or volatile material for discharge into the reactor chamber 2. In the event that the riser conduit 14 is terminated in the lower portion of the reactor chamber a distributor grid 34 is positioned substantially horizontally across the lower cross-sectional area of the reactor chamber and above the outlet of conduit 14. When the riser conduit 14 extends upwardly through the dense bed of catalytic material maintained therein, the conduit will extend through the grid 34 and provisions will be made for introducing an inert gaseous material such as steam beneath the grid through an annular distributor ring 36. Conduit 38 is provided for passing steam or other inert gaseous material to the distributor ring 36. Furthermore, with the riser conduit extended above the bed of catalytic material in a reactor chamber, additional reactant material may be introduced by conduit 40 through a suitable distributor means 42 positioned in the lower portion of the dense fluidized bed of catalytic material and above grid 34 previously described. Products of reaction separated from the catalyst in reaction chamber 2 are then passed through suitable cyclone separators 44 and 46 for the separation of entrained finely divided catalytic material from the reaction products with the thus separated finely divided catalyst being returned to the dense fluidized bed through diplegs 48 and 50. The reaction products leave cyclone separator 46 by conduit 52 and pass into plenum chamber 54 for removal from the apparatus by conduit 56 and pass to suitable recovery equipment, not shown. Provision is made in the upper portion of the reactor chamber 2 for the introduction of steam by conduit 58 to a suitable distributor ring 60. During the contact of the catalyst with vaporous reactants the catalyst becomes contaminated with both volatile and nonvolatile products of reaction. Prior to passing the catalyst to the regeneration compartment, it is desirable to strip the catalyst of reaction products or incompletely converted reactant material. To accomplish this end, contaminated catalyst is withdrawn from the lower portion of the dense fluidized bed of catalyst in the reactor through a well 62 which is open at its upper end and is above grid 34 for the passage of contaminated catalytic material downwardly through the well countercurrent to stripping gas introduced to the lower portion thereof through conduit 64 connected to conduit 66. In the lower portion of well 62 there is provided a vertically movable hollow stem plug valve 68 which is aligned with the bottom open end of a second riser conduit 70 extending from the lower portion of the stripper chamber 62 upwardly into the stripper chamber 10 and above the dense bed of catalytic material maintained therein. The upper end of stripper riser conduit 70 is provided with a "bird-cage" arrangement or other suitable device for discharging the contact material from the riser into the stripper chamber 10. It is to be understood that the upper end of the riser conduit may be of a design similar to that described with respect to the discharge end of riser conduit 14 containing a plurality of slots 18. A suitable stripping gas is passed to hollow stem plug valve 68 through conduit 72. In the stripping chamber 10 the catalyst passed upwardly through riser 70 is separated from the lift stripping gas with the catalyst settling onto the dense fluidized bed of catalyst maintained therein, and the stripping gas being removed from the upper portion of the stripper by passing through suitable cyclone separators 74 and 76 having diplegs 78 and 80. The stripping gas, including stripped products of reaction, leaves cyclone separator 76 by conduit 82 and passes into plenum chamber 54 for removal from the system with products of reaction as previously described. In stripping chamber 10 the finely divided catalytic material maintained in the lower portion of the stripper chamber moves generally downwardly countercurrent to stripping gas introduced to the lower portion of the stripping chamber by conduit 84 and distributor ring 86. The stripped catalytic material is then removed from the lower portion of the stripping chamber and passed downwardly through an open end and substantially vertical standpipe or conduit 88 to the lower portion of the dense fluidized bed of catalytic material in the regenerator chamber 4. Aligned with the bottom open end of standpipe 88 is provided a vertically movable plug valve 90 for controlling the rate of discharge of catalytic material from the bottom of standpipe 88 into the dense fluidized bed of catalytic material in the regeneration zone. As hereinbefore mentioned, regeneration gas is passed upwardly through the catalyst bed in the regeneration zone to remove products of reaction, including carbonaceous deposits, by burning in the presence of an oxygen-containing gas. Products of regeneration, such as flue gas, are then passed through suitable cyclone separators 92 and 94 being provided with diplegs 96 and 98, wherein entrained finely divided catalytic material with the flue gas is separated and returned to the dense fluidized bed through diplegs 96 and 98. The flue gases substantially free of entrained finely divided catalyst is then removed from cyclone separator 94 by conduit 100 to plenum chamber 102 and eventually removed from the system by conduit 104. Provision is made for introducing steam to the upper portion of the regenerator chamber 4 by conduit 106 to distributor ring 108. In addition to the above, suitable expansion joints 110 and 112 are provided which may be of the bellows type for allowing expansion and contraction of the riser and standpipe conduits as required.

Figure 2:
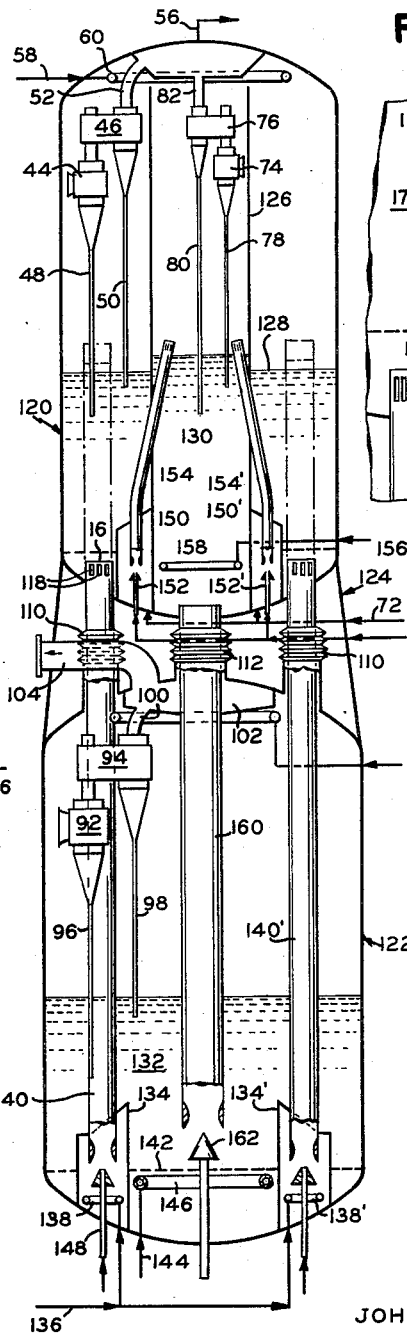
FIGURE 2 illustrates in diagrammatic elevation a modification of the apparatus or system of this invention for contacting cyclically circulated finely divided catalytic material with gaseous and vaporous materials employing a centrally positioned cylindrical stripping chamber.

Referring now to FIGURE 2, an apparatus similar to that described in FIGURE 1, except that the stripper is centrally positioned within the reactor, will now be specifically described. In this embodiment, a unitary vessel having an upper reactor chamber 120 and a lower regenerator chamber 122 is separated by a skirt member 124. Coaxially positioned within the reactor chamber 120 is a cylindrical stripper chamber defined by walls 126 which extends from the bottom of the reactor chamber substantially to the top thereof. The reactor chamber is provided with an annular dense fluidized bed or catalytic material 128 with the stripping chamber provided with a dense fluidized bed of catalytic material 130 and the regenerator chamber provided with a dense fluidized bed of catalytic material 132. In this embodiment, regenerated catalyst is withdrawn from the bed of catalyst 132 and passed downwardly through withdrawal and stripping wells 134 and 134'. The regenerated catalyst moves downwardly through the withdrawal wells countercurrent to stripping gas introduced to the lower portion thereof by conduit 136 to distributor rings 138 and 138'. The catalyst then reverses its direction of flow and is passed into the bottom open inlet of riser conduits 140 and 140'. Positioned in the lower portion of the regenerator chamber is a distributor grid 142 for uniformly distributing regeneration gases across the bottom cross-sectional area of the catalyst bed, which is introduced thereto by conduit 144 to distributor ring 146, which gases then pass upwardly through the bed to regenerate the catalyst as hereinbefore discussed. In riser conduits 140 and 140', similar or dissimilar vaporous and/or volatile material may be introduced to the bottom open inlet of the conduits by vertically movable hollow stem plug valves 148 and 148'. The vaporous material introduced by the hollow stem plug valves is admixed with finely regenerated catalyst and passes upwardly through riser conduits 140 and 140' into the reaction zone 120. In this embodiment the riser conduits 140 and 140' may terminate in the lower portion of the catalyst bed or they may be extended to above the upper dense phase level thereof as discussed in connection with FIGURE 1. Similarly, the upper end or discharge end of the riser conduits will be provided with a cap 16 and a plurality of elongated slots in the upper periphery thereof similar to those discussed in connection with FIGURE 1. Provision is also made for introducing a second hydrocarbon reactant into the lower portion of the dense fluidized bed in the reactor chamber similarly to that discussed in connection with FIGURE 1. In the reactor chamber a portion of the contaminated catalyst is withdrawn and passed downwardly through withdrawal wells 150 and 150' countercurrent to stripping gas introduced to the lower portion thereof similarly to that described in connection with FIGURE 1. The contaminated catalyst during its passage downwardly through withdrawal wells 150 and 150' is stripped of a portion of the reaction products contaminated with the catalyst, and thereafter the catalyst is picked up with additional stripping gas introduced by hollow stem plug valves 152 and 152' for transfer upwardly through riser conduits 154 and 154' into the upper portion of the central stripping chamber and above the upper level of the dense fluidized bed of catalyst 130 maintained in the stripping chamber. Here again the discharge end or the upper end of riser conduits 154 and 154' may be provided with a plurality of elongated discharge slots similarly to that discussed with respect to riser conduit 140 and 140' or riser conduit 70 of FIGURE 1. In this connection, the catalyst passing upwardly through the riser conduits 154 and 154' discharge into the upper portion of the stripping chamber wherein the stripping gas separates from the entrained catalyst with the catalyst setting onto the dense fluidized bed of catalyst 130 maintained therein and the stripping gas being removed as hereinafter more fully described. The catalyst transferred into the stripping zone, which has had a portion of the entrained vaporous products of reaction removed therefrom, is then caused to pass downwardly as a relatively dense fluidized bed of catalyst countercurrent to stripping gas such as steam introduced by conduit 156 to distributor ring 158 horizontally disposed in the lower portion of the stripping chamber. The stripped catalytic material is then removed from the lower portion of the stripping chamber and passed downwardly through a coaxially positioned standpipe 160 to the lower portion of the dense fluidized bed of contact material 132 and the regenerated chamber with the discharge outlet of the standpipe being above distributor grid 142 horizontally positioned in the lower portion of the regenerator chamber. A vertically movable plug valve is aligned with the bottom open end of standpipe 160 for controlling the rate of discharge of catalytic material from the bottom of the standpipe. The products of combustion are removed from the regenerator chamber through cyclone separators 92 and 94 having diplegs 96 and 98 similarly to that described in connection with FIGURE 1. Similarly, products of reaction are removed from the reaction chamber through suitable cyclone separators similarly as described in connection with FIGURE 1, with the stripped products of reaction and stripping gas removed through cyclone separating equipment similarly to that discussed in connection with FIGURE 1. Where possible, duplicate numerals have been employed in FIGURES 1 and 2 to simplify discussion, as well as to avoid unnecessary repetition in the discussion of the various portions of the apparatus. The apparatus of FIGURE 2 is also provided with expansion joints 110 and 112, similarly to that employed and discussed in connection with FIGURE 1.

Figure 3:
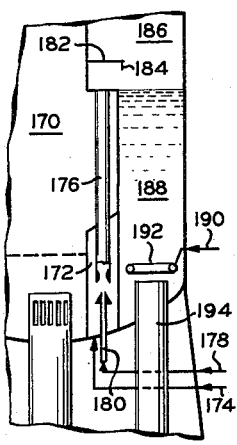
FIGURE 3 illustrates in diagrammatic elevation a modification of the apparatus of either FIGURES 1 or 2 for passing contact material vertically upwardly from the lower portion of the reaction chamber to the upper portion of the stripping chamber.

Referring now to FIGURE 3 of the drawings, which shows a modification of the apparatus for conveying catalyst from the conversion or reaction chamber to the stripping chamber, the catalyst is withdrawn from the dense fluidized bed of catalyst in the reaction compartment designated as bed 170 and passes downwardly through a withdrawal well 172 open at its upper end countercurrent to stripping gas introduced by conduit 174 to the lower portion of the well. In this embodiment, the contaminated catalyst is subjected to a first stripping treatment and thereafter it is passed substantially vertically upward through a riser conduit 176 in admixture with a suitable stripping gas introduced to the bottom of the riser by conduit 178 and vertically movable hollow stem plug valve 180. The mixture of catalyst and stripping gas passes upwardly through the riser and impinges above the discharge end of the riser upon a baffle 182 having a downwardly projecting flange 184 which flange functions to maintain a cushion of catalyst across the baffle 182 to reduce or virtually eliminate erosion thereof with the remaining portion of the catalyst and carrying gas, which in this particular instance is stripping gas, then spilling out into the stripping chamber 186 containing a relatively dense fluidized bed of catalyst 188 in the lower portion thereof. In the stripping chamber 186 the relatively dense bed of catalyst 188 is caused to move generally downwardly countercurrent to stripping gas introduced to the lower portion thereof by conduit 190 and distributor ring 192. Thereafter, the stripped catalyst is removed from the lower portion of the stripping compartment and passed downwardly through a suitable standpipe 194. It is to be understood that this substantially vertical riser arrangement for passing catalyst from the reaction compartment to the stripping compartment may be employed in either of FIGURES 1 and 2 previously described. Furthermore, it is to be understood that a plurality of these riser conduits similarly to 176 may be employed in the apparatus without departing from the scope of this invention.

It can be seen from the above discussion of the process and apparatus of this invention that numerous advantages are provided over the prior art in that it enables the refiner to carry out not only multi-stage cracking either with or without cascading catalyst, as well as multistage stripping of the contaminated catalyst whereby the tendency of passing incompletely stripped catalyst to the regeneration zone is substantially minimized. This has been accomplished by applicant without substantially increasing the size or elevation of the apparatus and therefore results in a most compact system which provides the refiner with a system of extreme flexibility of operation, as well as efficient stripping of the catalyst in the system. As a result of these improved apparatus designs and processes for carrying out the conversion or contact of gases and vapors with the catalytic material, the improvements result in a process of maximum versatility and economic advantage.

*Example I*

The following data is presented by way of example to show applicant's specific operating conditions for the process and apparatus of the present invention.

A. TRANSFER LINE CRACKING

[Riser extended above dense fluidized bed]

| | |
|---|---|
| Reactor temp., °F | 1000 |
| Pressure, p.s.i.g | 28 |
| Catalyst to oil ratio | 20 |
| W./hr./w. | 150 |
| Feed rate: | |
| B.p.s.d. | 35,000 |
| Number/hr. | 455,330 |
| Conversion, percent | 40 |

B. DENSE BED CRACKING

| | |
|---|---|
| Reactor temp., °F | 900 |
| Pressure, p.s.i.g | 20 |
| Catalyst to oil ratio | 40 |
| W./hr./w. (basis TF) | 0.8 |
| Throughput ratio | 1.67 |
| Feed rate: | |
| B.p.s.d. | 17,500 |
| Number/hr. | 235,000 |
| Conversion, on throughput, percent | 30 |

C. TRANSFER LINE STRIPPING

| | |
|---|---|
| Temperature, °F | 900 |
| Pressure, p.s.i.g | 22 |
| Catalyst to stripping gas, lbs./lb | 300 |

D. DENSE BED STRIPPING

| | |
|---|---|
| Temperature, °F | 900 |
| Pressure | 20 |
| Catalyst to stripping gas, lbs./lb | 300 |

E. FRESH FEED RISER

| | |
|---|---|
| °API gravity | 27 |
| K-factor | 11.0 |

F. DENSE BED FEED

| | |
|---|---|
| °API gravity | 22 |
| K-factor | 106 |

It will be understood that numerous modifications of the present invention may be made without departing from the spirit thereof and that the precise details hereinbefore set forth in the example are purely illustrative. For instance, the temperature in the transfer line cracking stage may be varied over a relatively wide range or when employing a plurality of transfer line conversion zones similar or dissimilar feeds may be employed with or without the same temperature in each riser. However, it is to be noted that the temperature employed in the transfer line cracking stage will be generally higher than that employed in the dense phase cracking stage and may be as much as 100° F. higher.

Having thus described my invention, it should be understood that no undue limitations or restrictions are to be imposed by reasons thereof.

I claim:

1. A system for contacting finely divided solid material with gaseous and vaporizable material comprising in combination, a regeneration chamber, a reactor chamber positioned above said regeneration chamber, a stripping chamber within said reactor chamber extending from the bottom thereof to substantially the top thereof separated by a common wall and adapted to prevent flow of finely divided solid material from said stripping chamber to said reactor chamber, at least one substantially vertical first riser conduit extending from the lower portion of said regeneration chamber upwardly into said reaction chamber, at least one second riser conduit extending from the lower portion of said reactor chamber upwardly into the upper portion of said stripping chamber above a fluid bed of finely divided solid material maintained in the lower portion thereof, a standpipe extending from the bottom of said stripping chamber substantially vertically downwardly to the lower portion of a fluid bed of solid material in said regeneration chamber, means for introducing a vaporizable material to the lower portion of said first riser conduit, means for introducing a gaseous material to the lower portion of said second riser conduit, means for introducing gaseous and vaporizable material to the lower portion of said reactor chamber, means for introducing a gaseous material to the lower portion of said stripping chamber and said regeneration chamber and means for removing gaseous material from the upper portion of each of said chambers.

2. A unitary apparatus comprising in combination an upper chamber and a lower regeneration chamber, said upper chamber separated by a transverse partition extending from the bottom thereto to substantially the top thereof forming a stripping chamber adjacent to a reactor chamber therein, said regenerator chamber, reactor chamber and stripping chamber each containing a relatively dense fluidized bed of finely divided contact material therein, at least one riser conduit extending from the lower portion of said regenerator chamber substantially vertically upwardly into said reactor chamber, at least one transfer line conduit connecting the lower portion of said reactor chamber with the upper portion of said stripping chamber and above the fluid bed of contact material therein, a standpipe connecting the bottom of said stripping chamber with the lower portion of said regenerator chamber, vertically movable hollow stem plug valves aligned with the bottom open end of said riser and transfer line conduits, means for introducing a gaseous material to the lower portion of each of said chambers and means for removing a gaseous material from the upper portion of each of said chambers.

3. A unitary apparatus comprising in combination an upper chamber and a lower chamber, said upper chamber provided with a cylindrical chamber coaxially positioned therein forming an annular chamber therewith and extending from the bottom theerof to substantially the top thereof, at least two riser conduits extending from the lower portion of said lower chamber upwardly into said annular chamber with one of said riser conduits terminating in the lower portion of said annular chamber and another of said riser conduits terminating in the upper portion of said annular chamber, at least two transfer conduits extending upwardly from within a well in the lower portion of said annular chamber to the upper portion of said cylindrical chamber, said transfer conduits and said riser conduit being positioned 90 degrees apart from one another in said annular chamber, a substantially vertical conduit connecting the lower portion of said cylindrical chamber with the lower portion of said lower chamber, means for introducing a gaseous material to the lower portion of each of said chambers, means for introducing a vaporizable material to the bottom of said riser conduits, means for introducing gaseous material to the bottom of said transfer conduits, means for introducing a gaseous material to the bottom of said cylindrical and lower chamber, and means for removing gaseous material from the upper portion of each of said chambers.

4. A unitary apparatus comprising in combination an upper chamber and a lower regenerator chamber, said upper chamber separated into a reactor chamber by a common wall and a stripping chamber, at least one transfer line conversion conduit open at its bottom end extending from the lower portion of said regenerator chamber substantially vertically upwardly into the upper portion of said reactor chamber, the upper end of said transfer line conduit being capped and provided with a plurality of elongated open slots around the upper periphery, a vertically movable hollow stem plug valve aligned with the bottom open end of said transfer line conduit for the introduction of vaporous material thereto, at least one riser conduit extending upwardly from the lower portion of said reactor chamber to the upper portion of said stripping chamber, a vertically movable hollow stem plug valve aligned with the bottom of said riser conduit for the introduction of gaseous material thereto, a standpipe extending from the lower portion of said stripping chamber to the lower portion of said regenerator chamber, a plug valve aligned with the bottom of said standpipe, means for introducing gaseous material and partially vaporized material separately to the lower portion of said reactor chamber, means for introducing gaseous material beneath a perforated grid across the lower portion of said regenerator chamber and means for separately withdrawing gaseous material from the upper portion of said reactor chamber, stripping chamber and regenerator chamber.

5. A unitary apparatus comprising an upper chamber and a lower regenerator chamber, an elongated cylindrical stripping chamber confined within and extending from the lower portion of said upper chamber to substantially the upper portion thereof forming an annular reactor chamber therewith, said chambers containing a dense fluid bed of contact material in the lower portion thereof, a plurality of diametrically opposed transfer line conduits extending upwardly from the lower portion of the regenerator chamber to the upper portion of said annular chamber and above the fluid bed of contact material therein, means for introducing a vaporous material to the lower portion of said transfer line conduits, a plurality of diametrically opposed riser conduits extending from the lower portion of said annular chamber upwardly into the upper portion of said stripping chamber and above the fluid bed of contact material therein, a standpipe extending from the lower portion of said stripping chamber substantially vertically downwardly to the lower portion of said regeneration chamber and terminating above a perforated grid across the lower cross-sectional area thereof, means for introducing a gaseous material beneath said perforated grid, means for introducing a gaseous material to the lower portion of said annular chamber and said stripping chamber, and means for withdrawing gaseous material from the upper portion of each of said chambers.

6. An apparatus comprising an upper reactor chamber and a lower regenerator chamber, a stripping chamber confined within said reactor chamber separated by a common wall and in open communication therewith in the upper portion thereof, said reactor, regenerator and stripping chambers containing a fluid bed of contact material therein, said stripping chamber being of larger cross sectional area in the upper portion than in the lower portion thereof, at least one substantially vertical open end riser conduit extending from the lower portion of said reaction chamber to the upper enlarged area of said stripping chamber, means for introducing gaseous material to the bottom open end of said riser conduit, means for introducing gaseous material to the lower portion of each of said chambers, at least one transfer line conduit extending from the lower portion of said regeneration chamber substantially vertically upward into the lower portion of said reactor chamber, means for introducing a vaporous material to the bottom of said transfer line conduit, a standpipe extending downwardly from the bottom of said stripping chamber to the lower portion of said regenerator chamber and terminating above a perforated grid across the lower cross-sectional area thereof.

References Cited in the file of this patent

UNITED STATES PATENTS

| | | |
|---|---|---|
| 2,621,113 | Alther | Dec. 9, 1952 |
| 2,631,927 | Trainer | Mar. 17, 1953 |
| 2,671,102 | Jewell | Mar. 2, 1954 |
| 2,895,811 | Schaaf | July 21, 1959 |
| 2,900,324 | Patton et al. | Aug. 18, 1959 |
| 2,900,329 | Osborne et al. | Aug. 18, 1959 |
| 2,900,330 | Skelly | Aug. 18, 1959 |

FOREIGN PATENTS

| | | |
|---|---|---|
| 509,535 | Canada | June 25, 1955 |